April 26, 1966  N. A. PIERSON  3,248,176
APPARATUS FOR COLLECTING AND TREATING
HETEROGENEOUS WASTE MATERIALS
Original Filed May 11, 1961  3 Sheets-Sheet 1
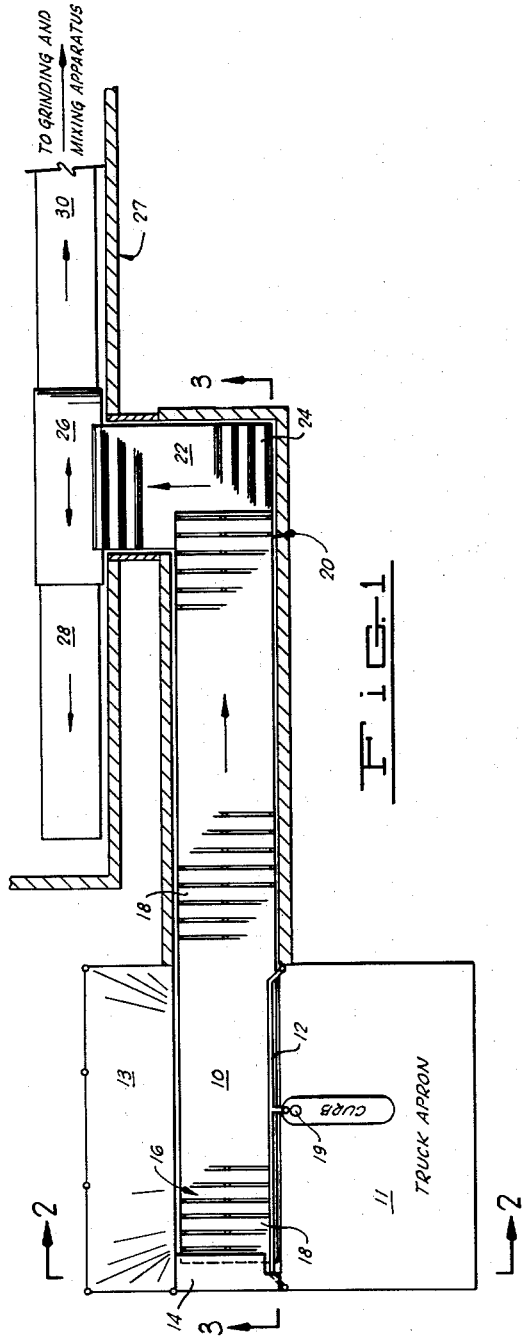
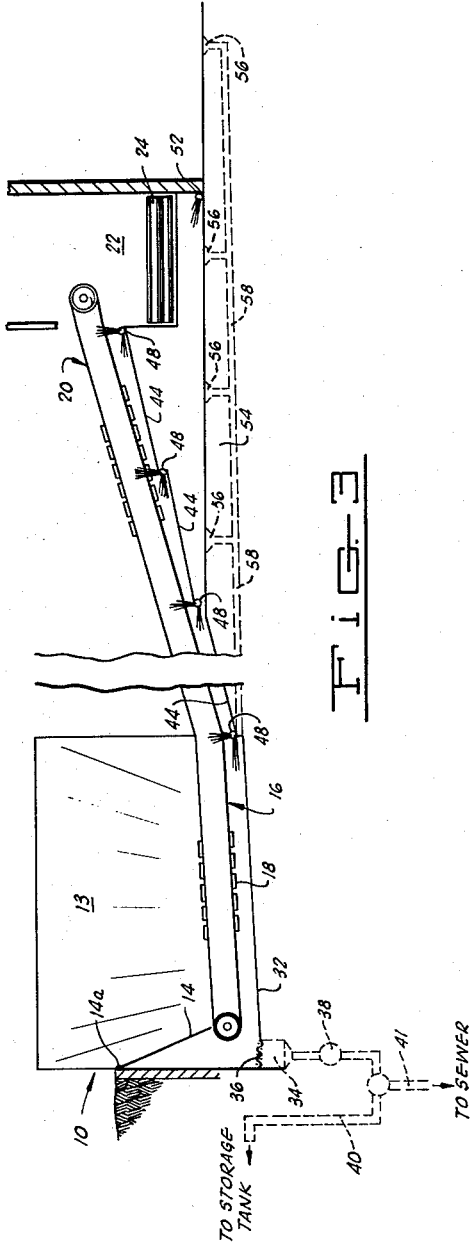
INVENTOR.
NORMAN A. PIERSON
BY
Dunlap, Laney & Hubbard
ATTORNEYS

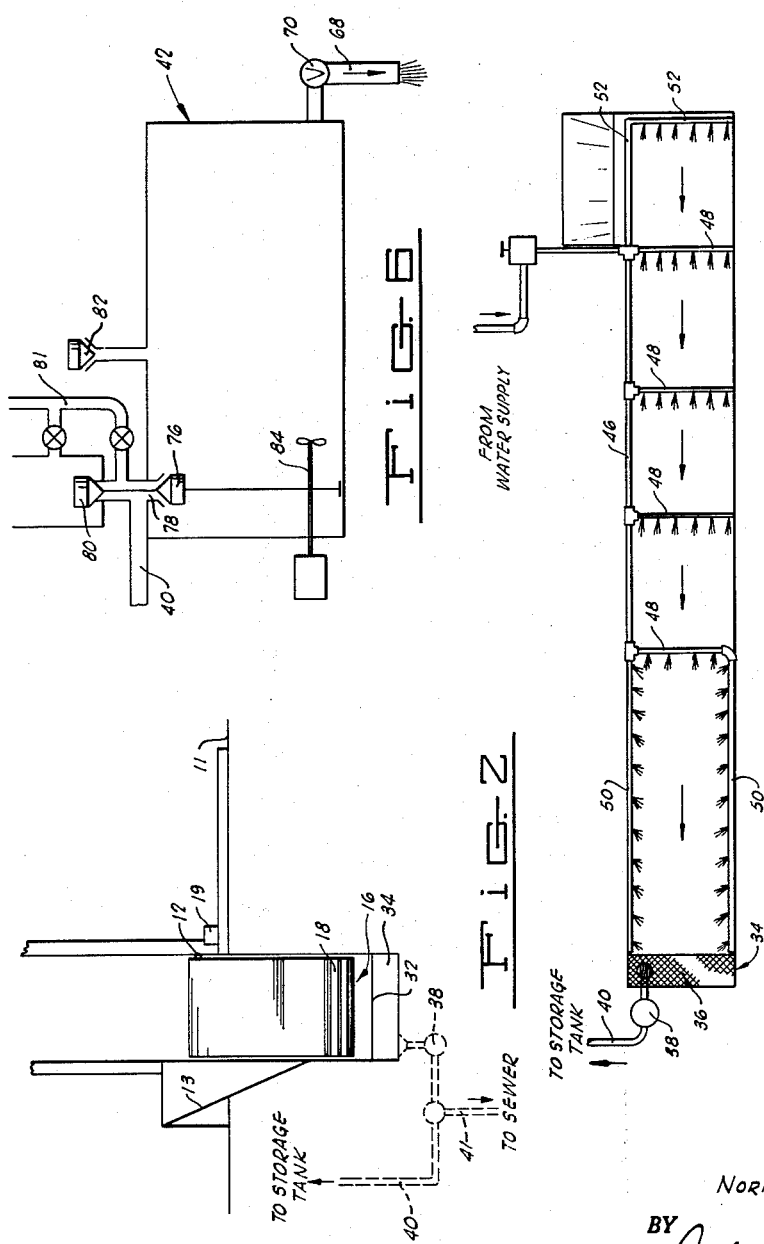

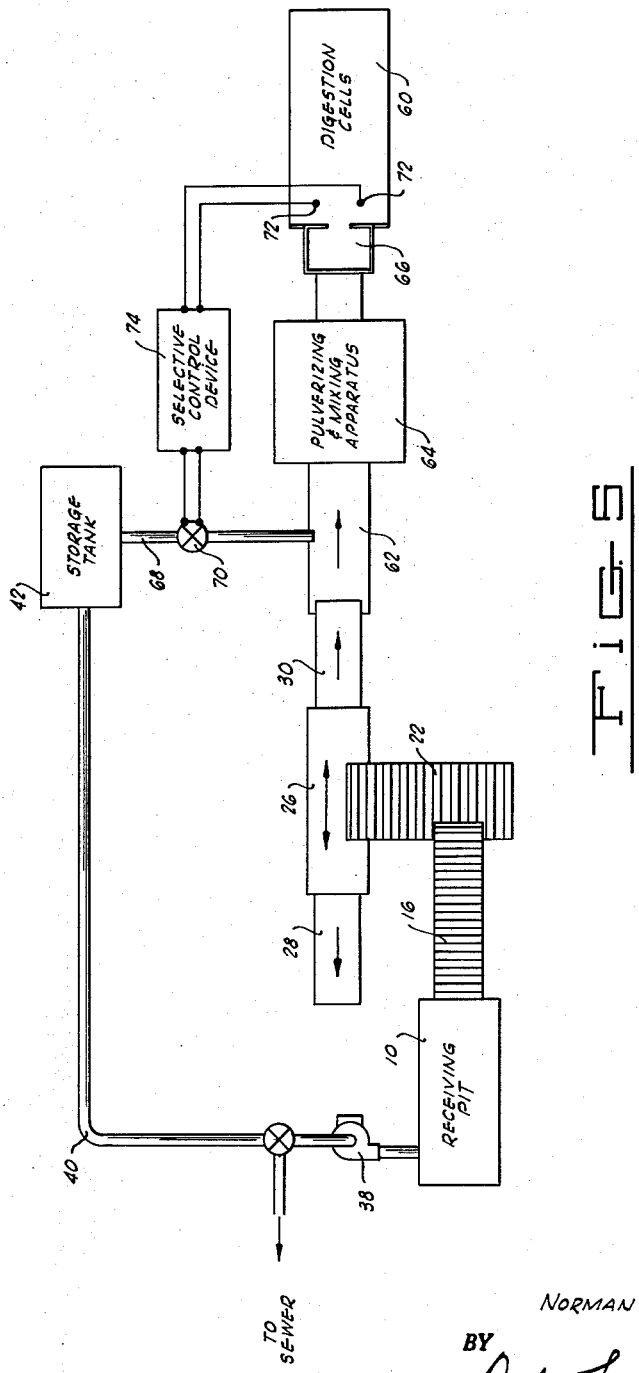

3,248,176
APPARATUS FOR COLLECTING AND TREATING HETEROGENEOUS WASTE MATERIALS
Norman A. Pierson, Norman, Okla.
Continuation of application Ser. No. 109,324, May 11, 1961. This application Jan. 26, 1965, Ser. No. 430,235
21 Claims. (Cl. 23—259.1)

This is a continuation of applicant's co-pending application of the same title, Serial No. 109,324, filed May 11, 1961, now abandoned.

This invention relates to a system for collecting municipal refuse and analogous waste materials of a heterogeneous nature, and for treating such materials preparatory to converting them to useful products. In a more specific aspect, the present invention relates to improvements in a system for collecting municipal refuse and adjusting the moisture content thereof prior to converting the refuse to useful products.

One of the problems confronted in the collection and disposal of municipal refuse is the need for sanitary handling of the refuse from the time it is dumped from collection trucks at a centrally located depository until it is ultimately disposed of. In plants which undertake to convert all or part of the refuse to useful products such as compost, methane, and other organic chemicals, it is highly desirable that a sanitary and safe system be provided for receiving refuse from the collection trucks and for passing this refuse into the processing plant for further treatment.

Although fairly high standards of sanitation have been achieved in some of the refuse receiving systems heretofore in use, these systems have usually not provided for the most economic handling of the raw refuse, since some of the beneficial components of the refuse have been lost in such systems. For example, in order to prevent the liquids of the refuse from presenting a situs for the breeding of mosquitoes and disease germs, the refuse has sometimes been dried or its liquid content otherwise extracted and these liquids discarded. Since the liquids so discarded often contain chemicals and organisms which may be used to good advantage in the subsequent refuse processing operations, the disposal of these liquids after they are removed from the refuse is a wasteful procedure.

With the recent development of composting plants which may, for the first time, economically convert large quantities of municipal refuse to beneficial compost by the process of bacterial decomposition, the moisture content of the refuse being so converted has assumed a new magnitude of importance. Thus, in order to provide conditions conducive to optimum bacterial activity, it is necessary in such composting processes to adjust the moisture content of the refuse within a certain range. To date, insofar as I am aware, the means employed for adding water or an aqueous fluid to the refuse for the purpose of adjusting its moisture content have been rather inefficient and have depended largely upon the estimating ability of operating personnel. Moreover, moisture content control has been sporadic, or at least periodical rather than continuous, so that within the period between checks of the moisture content the refuse may easily become too dry or too wet to present the optimum conditions for bacterial activity.

In one of its broader aspects, the present invention provides a system for sanitarily removing a substantial quantity of the liquid content of the raw refuse as it is brought to the processing plant, and for using the liquids so removed to adjust the moisture content of the refuse to a level desirable for subsequent composting by bacterial decomposition. In this manner, the refuse material is dried to promote sanitation prior to its introduction to the processing plant and the fluids removed from the refuse are then utilized to bring the refuse in the processing plant to the desired moisture content for subsequent conversion to the desired products.

In a more specific aspect, the invention provides apparatus for efficiently removing a large portion of the liquid content of municipal refuse as the refuse is received from collection trucks at a processing plant. The apparatus provides for the maintenance of maximum cleanliness in and around the area where the refuse is first received, and around and under the conveyor and storage bins which are utilized for moving and storing the refuse prior to introducing it into the processing plant. Novel means are provided for preventing the occurrence or spread of fire which may originate in the refuse or in the receiving and conveying equipment.

In another of its aspects, the present invention provides a novel and highly efficient control system for continuously monitoring and controlling the moisture content of refuse prior to introducing the refuse to composting cells where bacteriological decomposition is to take place. The control system is completely automatic in its operation and is effective to constantly maintain the moisture content of refuse being fed to the digestion cells between preselected minimum and maximum values. The moisture control system is further characterized in having means integrated in the system for introducing an aqueous inoculant enriched with beneficial bacteria to the refuse at a point in the processing plant where the inoculant may be thoroughly mixed with the refuse before the refuse is charged to the digestion cells.

In accordance with the foregoing discussion, it is an object of the present invention to provide a system for receiving refuse from refuse collection trucks, and for conveying the refuse to a raw refuse storage bin in a sanitary manner.

An additional object of the present invention is to provide apparatus for efficiently receiving loads of refuse intermittently dumped from refuse collection trucks, and for moving the refuse so received into an accumulator for storage prior to introduction into a refuse processing plant.

An additional object of the invention is to remove a substantial portion of the liquid content from refuse received from refuse collection trucks, and to collect the extracted liquids in a storage tank for subsequent use in adjusting the moisture content of the refuse in accordance with the demands of the particular type of processing to be employed.

A further object of the present invention is to provide a system in which the liquids are extracted from raw refuse after it is received in order to prevent the development of a situs for the breeding of mosquitoes and other vermin. The liquid so extracted is subsequently utilized in adjusting the moisture content of the refuse to a desired level for subsequent processing in a composting operation.

A further object of the present invention is to efficiently and economically collect loads of refuse intermittently dumped from refuse collection trucks at a central point of accumulation, from which point it may be subsequently fed in metered amounts into a refuse processing plant.

An additional object of the present invention is to provide a scavenging system for maintaining the cleanliness of the area around and under a system for receiving refuse from collection trucks at a refuse processing plant.

An additional object of the invention is to provide novel means in combination with said scavenging system for preventing the occurrence or spread of fire in the refuse receiving system.

Yet another object of the invention is to provide a refuse receiving system in which liquid and small particulate solid material which is collected from the refuse may be conserved and subsequently utilized in processing the refuse to produce useful products.

Another object of the invention is to provide means for adding a bacteria-enriched inoculum to the refuse preparatory to charging the refuse to the composting cell.

A further object of the invention is to continuously monitor the moisture content of refuse being charged to a composting cell, and for automatically adding an aqueous material to the refuse to keep the moisture content at an optimum level for bacterial activity.

These objects and advantages, and other additional objects and advantages, will become apparent and will be better understood by referring to the following description in conjunction with the attached drawings which illustrate my invention.

In the drawings:

FIGURE 1 is a partially schematic plan view of the refuse receiving system of the present invention.

FIGURE 2 is a view in section taken along line 2—2 of FIG. 1.

FIGURE 3 is a view in section taken along line 3—3 of FIG. 1.

FIGURE 4 is a plan view of the wash and scavenging system of the present invention.

FIGURE 5 is a schematic flow diagram illustrating the manner in which liquid is extracted from the raw refuse when it is received, and then subsequently added to the refuse for continuously maintaining the moisture content of the refuse at an optimum level for bacteriological decomposition.

FIGURE 6 is a schematic illustration of the novel storage tank used for storing liquids to be added to the refuse for controlling the moisture content thereof.

Referring now to the drawings in detail, and particularly to FIG. 1, a receiving pit 10 is provided into which the refuse carried by municipal refuse collection trucks may be dumped. A truck apron 11 onto which the trucks may be backed is located adjacent the receiving pin 10, and a bumper rail 12 extends along one side of the pit 10 slightly above the level of the truck apron 11.

A sloping wall 13 is provided at the back of the pit 10 and a slide plate 14 is located at one end of the pit. Both the wall 13 and the slide plate 14 are inclined at an angle of about sixty degrees to the vertical so that refuse contacting these members will gravitate toward the bottom of the pit. The upper edge 14a of the slide plate 14 is hingedly secured to the wall of the pit 10 for a purpose hereinafter described.

A conveyor 16 comprising a plurality of spaced slats 18 secured to endless chains (not seen) extends across the bottom of the receiving pit 10 and upwardly from the receiving pit at an angle of approximately twenty-three degrees to the horizontal. An electrical control switch 19 is located adjacent the pit 10 to permit the truck drivers to actuate the conveyor 16 after they have dumped their loads of refuse. At its end 20 located remotely from the receiving pit 10, the conveyor 16 extends over a refuse receiving pit 10, the conveyor 16 extends over a refuse receiving chamber 22 in the manner most clearly illustrated in FIG. 3. A conveyor 24 is located in the bottom of the refuse receiving chamber 22 for moving the refuse accumulated in the receiving chamber 22 into a processing plant for subsequent treatment.

In a typical processing plant arrangement, the conveyor 24 in the receiving chamber 22 first moves the refuse accumulated in the receiving chamber onto a feed table 26 located inside the processing plant 27. The surface of the feed table 26 which supports the refuse deposited thereon by the conveyor 24 may suitably comprise a reversible belt-type conveyor so that optional feeding of the refuse to a discard conveyor 28 or to a picking table 30 may be facilitated. After certain salvageable components of the refuse have been manually removed therefrom while the refuse is on the picking table 30, the refuse is then delivered to suitable grinding and mixing apparatus for further processing.

As has been previously indicated, it is highly desirable that a substantial portion of the free liquid entrapped in the raw refuse be removed therefrom prior to accumulation and storage of the refuse at a central location. Such extraction of liquid is efficiently accomplished in the refuse receiving system illustrated in FIGS. 1 through 3. In referring to FIG. 2, it will be noted that when refuse is dumped from collection trucks into the receiving pit 10, the refuse must fall a substantial distance in the pit before striking the slatted conveyor 16. In falling, the refuse has an opportunity to turn over one or more times so that water or liquids contained in tin cans, cartons and the like will be poured out. Moreover, the refuse strikes the slatted conveyor 16 with sufficient impact to break open partially sealed containers which may hold residual fruit juices, milk, water, oils or other liquid materials.

The liquids which are thus separated from the raw refuse pass downwardly through the slats 18 of the conveyor 16 and by this route reach the bottom 32 of the pit 10. As shown in FIG. 3, the bottom 32 of the pit 10 slopes toward one side of the pit. A sump 34 is located at the lowest side of the bottom 32 of the pit 10 for receiving liquids which drain into the bottom of the pit. A suitable screen 36 covers the sump 34 to prevent the sump from becoming clogged by any solid materials which may fall through the slatted conveyor 16 into the bottom 32 of the pit 10. In order to clean the screen 36, the slide plate 14 may be pivoted upwardly about its hinged edge 14a to allow access to the screen. The liquids which collect in the sump 34 are pumped by a sump pump 38 through conduit 40 to a suitable liquid storage tank 42 (see FIG. 5), where they remain available for subsequent use in adjusting the moisture content of the refuse preparatory to certain refuse processing operations. Alternatively, the sump liquids may be discharged to a sewer through conduit 41, if desired. The moisture control system of the present invention and the manner in which it is operated are described in greater detail below.

After the raw refuse has been deposited on the slatted conveyor 16 in the pit 10, it is moved upwardly by the conveyor toward the refuse receiving chamber 22. The conveyor 16 is inclined at an angle of about twenty-three degrees to the horizontal so that the solid portion of the refuse will not slide back down the conveyor into the pit 10, but yet residual liquids in the refuse and on the slats 18 will drain down through the conveyor. A plurality of baffle plates 44 are disposed immediately beneath the inclined portion of the conveyor 16 to catch the liquids which drain through the conveyor. The baffle plates 44 are inclined and overlapping, as shown in FIG. 3, so that liquids falling upon the baffle plates drain back into the pit 10.

In order to prevent the coagulation of viscous fluids such as syrups, oils and the like on the baffle plates 44 and on the bottom 32 of the pit 10, as well as to maintain generally sanitary conditions around and under the refuse receiving system, novel washing and scavenging apparatus is provided for use in conjunction with the refuse receiving system. The washing and scavenging apparatus comprises a main water line 46 to which are connected a series of perforated spray pipes 48. The spray pipes 48 are positioned beneath the conveyor 16 in spaced relation along the length thereof and are perforated so that water is directed downwardly along the baffle plates 44 toward the pit 10. The spray pipes 48 are also perforated along the upper surface thereof so that a portion of the wash water is directed vertically against the slatted conveyor 16. The spray pipes 48 thus function in part as a fire preventative system.

In addition to the spray pipes 48 located between the conveyor 16 and the baffle plates 44, other spray pipes 50 are arranged along each side of the receiving pit 10 and are perforated or provided with suitable nozzles to direct wash water down the bottom 32 of the receiving pit toward the sump 34. There are also spray pipes 52 located beneath the refuse receiving chamber 22 for keeping this area clean and sanitary. Concrete flooring 54 is provided under all of the refuse receiving system and a plurality of drains 56 are located in the flooring so that when the floor is washed down, all dust, spores and bacteria which accumulate on the floor are received in the drains. All of the drains 56 connect to a drain line 58 extending into the highest end of the pit 10 so that all of these waste materials will be collected in the sump 34. The washing down and collection of spores and bacteria in the sump 34 is an important aspect of this invention since these organisms can subsequently be beneficially utilized to inoculate the refuse preparatory to a composting process in which bacteriological decomposition is the primary reaction. Such inoculation of the refuse is discussed in greater detail below.

The manner in which liquids collected in the sump 34 may be utilized to adjust the moisture content of the refuse preparatory to further processing of the refuse is best illustrated in FIG. 5. In the preferred embodiment illustrated, the moisture control system of the invention is shown as it is applied to a typical refuse composting plant. In general, such plants have one or more large housings or cells in which bacterial digestion or decomposition of the refuse is induced and allowed to proceed. Such cells are illustrated schematically in FIG. 5 and are designated generally by reference character 60.

After the raw refuse has been dumped into the receiving pit 10, it is carried upwardly by the slatted conveyor 16 to the refuse receiving chamber 22. From the receiving chamber 22, the refuse is passed onto a feed table conveyor 26 inside the composting plant. Normally, the refuse will then be passed onto a picking table 30 to allow such salvageable components as rags, glass, metals, etc., to be manually or otherwise removed. The refuse then passes onto a conveyor 62 which carries it into suitable pulverizing and mixing apparatus 64. In the pulverizing and mixing apparatus 64, the average particle size of the refuse is substantially reduced and a thorough mixing of the components of the refuse is effected. After mixing and pulverization, the refuse is discharged into a suitable elevator 66 which carries the refuse upwardly and deposits it into the uppermost digestion cell 60 of a series of vertically spaced digestion cells.

In order for bacteriological decomposition to proceed at an optimum rate in the digestion cells, it is essential that the moisture content of the refuse entering the cells be adjusted within a predetermined range. This range will, of course, vary to some extent according to the type of refuse which is to be composted, but in any composting operation the optimum moisture content range will have been determined by appropriate tests upon typical specimens of refuse which will be subjected to the composting operation.

As has been previously indicated, the present invention contemplates continuous automatic control of the refuse moisture content utilizing, in large part, liquids which have been extracted or separated from the raw refuse when it is first brought to the composting plant. The liquids which have been recovered from raw refuse are circulated by the sump pump 38 through the conduit 40 into a liquid storage tank 42. The interior of the storage tank 42 is in communicatoin with a discharge conduit 68 which terminates over the refuse being carried into the pulverizing and mixing apparatus 64 upon the conveyor 62. A control valve 70 is interposed in the discharge conduit 68 so that the rate of introduction of liquid from the storage tank 42 into the refuse may be controlled according to the degree of closure of the valve.

Although the control valve 70 may be manually adjusted, such manual control requires the development of considerable skill and ability by operating personnel to the extent that the moisture content of the refuse may be manually determined, such as by squeezing a small portion of the refuse. The preferred embodiment of the invention illustrated in FIG. 6, however, contemplates the utilization of an electrical control system for automatically controlling the moisture content of refuse entering the digestion cells. Thus, two or more sensing electrodes 72 are disposed at the entrance of the uppermost or initial digester cell 60 in a position for continuously contacting the refuse as it enters the digestion cell. The resistance between the two electrodes 72 constitutes a measure of the moisture content of the refuse entering the cell.

The electrodes 72 are connected to a selective control device 74 which is connected to the control valve 70. The selective control device 74 is provided to permit the control valve 70 to be continuously adjusted so as to keep the moisture content of the refuse entering the digester cells within a preselected moisture content range. The desired range of moisture content is set into the selecting control 74 before the composting plant is placed in operation, and the selective control device 74 then functions in response to the moisture content sensed by the electrodes 72 to open or close the control valve 70 as is necessary to maintain the moisture content at the desired level. Any suitable electrical circuitry may be used for sensing the moisture content of refuse entering the digester cell 60, and for controlling the degree of closure of the valve 70 in correspondence to such moisture content. For example, the meter relay and control circuitry manufactured by Tipptronic, Inc., of Tipp City, Ohio, may be utilized in conjunction with a limited torque motor valve manufactured by the Philadelphia Gear Works, Inc., of Philadelphia, Pennsylvania, to accomplish the desired control described above. Suitable electrical circuitry for this type of control is also manufactured by the Minneapolis-Honeywell Company, of Minneapolis, Minnesota.

The construction of the fluid storage tank 42 is an important feature of the present invention. As illustrated in FIG. 6, the storage tank 42 is provided with a float valve 76 for closing the inlet 78 to the tank when a predetermined level of water, sewage or other liquid additive has been reached. A suitable conduit 81 is connected to the top of the tank 42 to facilitate the introduction of raw sewage to the tank when desired. A bypass valve 80 is opened upon closure of the float valve 76 to direct the incoming water or sewage sludge to a sewer system. The tank 42 is also provided with a pop-off valve 82 in the top thereof which will open in the event excessive gas pressures are created in the tank 10. Such a pop-off valve is necessary since sewage sludge in the tank 10 will frequently generate an appreciable amount of methane. A suitable agitator or stirrer 84 is positioned in the lower portion of the tank 42 to continuously mix the contents of the tank, particularly when the tank contains sewage sludge.

*Summary of operation of system*

To summarize the operation of the system for collecting and treating refuse material which is disclosed and discussed hereinbefore, the refuse is initially dumped by refuse collection trucks into the receiving pit 10 where it comes to rest upon the slatted conveyor 16. A substantial portion of the liquid content of the refuse drains downwardly through the slats 18 of the conveyor 16 into the bottom 32 of the pit 10 as the refuse falls and when it strikes the conveyor 16 with considerable impact. An additional portion of the entrained liquids drains down through the slats 18 of the conveyor 16 as the refuse is moved upwardly upon the inclined portion of the conveyor after the truck driver has actuated the conveyor by pressing the starter button 19. The liquids which drain down through the slats 18 of the conveyor 16 as the refuse is moved toward the refuse receiving chamber 22 fall upon the inclined baffle plates 44. The washing and scavenging system of the invention then comes into play to wash the liquids collected on the baffle plates 44 downwardly into the bottom 32 of the receiving pit 10. Any solid or liquid materials which fall upon the concrete flooring 54 which underlies the conveyor 16 and refuse receiving chamber 22 are also washed into the receiving pit 10 via the drains 56 and main drain line 58.

After the refuse has been deposited in the refuse accumulator chamber 22, it is moved in metered amounts by the conveyor 24 into the refuse composting plant. In a typical refuse processing plant, the refuse from the refuse receiving chamber 22 may be deposited upon a feed table conveyor 26. The feed table conveyor 26 is reversible so that the refuse may be passed onto a selection and discard conveyor 28 or onto a picking table 30. From the picking table 30, the refuse is moved onto a conveyor 62 which conveys the refuse to the entrance of the pulverizing and mixing apparatus 64. It is during the time that the refuse is resting upon the conveyor 62 that liquids are added thereto to bring the moisture content of the refuse to the desired level.

In referring to FIG. 5, it will be perceived that water which is collected in the sump 34 in the bottom 32 of the receiving pit 10 is circulated by the sump pump 38 through the conduit 40 and into the liquid storage tank 42. In addition to liquids collected in the sump 34 and pumped into the storage tank 42 by the sump pump 38, it will, in many cases, be desirable to add a material which is rich in beneficial bacteria and fungi to the liquid collected in the storage tank 42. For this purpose, a conduit 81 is provided in communication with the storage tank 42 to facilitate the introduction of raw sewage enriched with bacteria to the tank (see FIG. 6).

It will be understood from the description of the system as it has been thus far developed that the concept of collecting and storing the liquids extracted from the raw refuse as it is received permits the beneficial bacteria and spores contained in such liquid to be conserved and subsequently utilized in such refuse processing operations as composting by bacteriological decomposition. Moreover, the bacteria content of the liquids which are added to the refuse through the discharge conduit 68 may be further increased by adding a substantial portion of raw sewage to the contents of the liquid storage tank 42.

In the mixing and pulverizing apparatus 64, the liquids, including the raw sewage, which have been added to the refuse while it is upon the conveyor 62 are thoroughly mixed with the refuse, and the refuse is reduced in particle size to the desired extent. The moistened, pulverized refuse is then passed out of the pulverizing and mixing apparatus 64 and into a suitable elevator 66 for carrying the refuse upwardly into the uppermost digestion cell 60 of a series of vertically spaced digestion cells. As the moistened, comminuted refuse enters the first digestion cell 60, its moisture content is sensed by the electrodes 72. The selective control device 74 responds to the moisture content of the refuse as indicated by the electrical resistance of refuse between the electrodes 72 to control the degree of closure of the control valve 70. The selective control device 74 may be set to adjust the valve 70 so that the moisture content of the refuse is always maintained within a certain pre-determined range.

From the foregoing description, it will be perceived that the present invention provides a system for sanitarily receiving raw refuse at a refuse processing plant, and for conserving the liquids which are extracted from such refuse for subsequent beneficial utilization in the processing of the refuse to useful products. Highly beneficial bacteria and fungi are conserved by the system and method employed and, although the system has particular value in its adaptation to use in a bacterial composting plant, the principles which are described may likewise be employed in other types of refuse processing systems.

Changes in the details of construction of the elements of the present invention, as well as variations in the steps of the method employed, will occur to those skilled in the art. Insofar as such changes employ only the use of equivalent elements and structures and do not depart from the principles of the invention, they are deemed to fall within the scope of the invention as defined by the following claims.

I claim:
1. In a system for composting refuse, the improvement which comprises:
   a pit for receiving raw refuse;
   refuse receiving means elevated above ground level and spaced horizontally from said pit;
   a slatted conveyor extending across the bottom of said pit and upwardly to said elevated refuse receiving means;
   drain means under said conveyor;
   a sump in the bottom of said pit below said slatted conveyor;
   liquid delivery pipes positioned under said conveyor between said pit and refuse receiving means for washing into said sump via said drain means liquid and solid materials falling through the slats of said conveyor;
   a storage tank connected to said sump for receiving the washings flowing into said sump;
   a conduit communicating with said storage tank and extending over the path of refuse discharged from said refuse receiving means; and
   valve means in said conduit for controlling the flow of material from said storage tank to said refuse whereby the moisture content of said refuse may be regulated as desired prior to composting the refuse by bacterial decomposition.

2. In a system for composting municipal refuse, the improvement claimed in claim 1 wherein:
   said conveyor extends upwardly from said pit to said refuse receiving means at an angle to the horizontal of about twenty-three degrees; and
   wherein said washing means comprises baffle plate means under said conveyor between said pit and refuse receiving means, said baffle plate means being inclined toward said pit to permit liquid drainage into said pit; and
   a plurality of perforated water supply pipes extending between said conveyor and said baffle plate means and adjacent the bottom of said pit for washing drippings, dust, spores, waste materials and the like into said sump.

3. In a system for composting municipal refuse, the improvement claimed in claim 1 wherein:
   said valve means comprises a valve in said conduit for controlling the volume of flow through said conduit; and
   electrical control means for automatically controlling the degree of closure of said valve in accordance with the moisture content of said refuse.

4. In a system for composting municipal refuse, the improvement claimed in claim 3 wherein:
   said electrical control means comprises a pair of electrodes positioned in said refuse in spaced-apart relation for electrically sensing the moisture content of said refuse; and
   means connected between said electrodes and said valve for opening said valve when the moisture content of said refuse reaches a preselected minimum value, and for closing said valve when the moisture content of said refuse reaches a preselected maximum value.

5. In a system for composting municipal refuse, the improvement claimed in claim 1 and characterized further to include:
   a pop-off valve in said tank for releasing gases generated in said tank;
   feed conduit means interposed between said sump and said tank for directing washings accumulated in said sump into said tank;
   a bypass conduit connected to said feed conduit means for diverting the flow of liquid from said sump to a sewer;

float valve means in said tank and responsive to the level of liquid in said tank for interrupting the flow of liquid into said tank from said feed conduit means; means for introducing sewage sludge to said tank; and means for agitating the contents of said tank.

6. A system for receiving and processing municipal refuse in a sanitary manner comprising:
a pit for receiving refuse dumped from trucks carrying said refuse, said pit having a depth sufficient to allow said refuse to turn in falling from said truck to the bottom of said pit, and to cause said refuse to strike the bottom of said pit with an impact of sufficient magnitude to break open liquid-containing portions of said refuse;
a refuse receiving means located above the level of the ground and horizontally spaced from said pit;
a slatted conveyor across and substantially covering the bottom of said pit and extending upwardly from said pit to said receiving means at an acute angle to the horizontal;
a sump in the bottom of said pit beneath said conveyor; and
means for washing into said sump liquid and solid materials falling through the slats of said conveyor, said washing means including a baffle positioned below the upwardly extending portion of said slatted conveyor and inclined downwardly toward said pit; and pipes having openings therein positioned between said conveyor and said baffle for delivering a liquid to the surface of said baffle.

7. A system for receiving and processing municipal refuse as claimed in claim 6 wherein:
said slatted conveyor extends upwardly from said pit to said receiving means at an angle to the horizontal of about twenty-three degrees, whereby maximum liquid drainage from said refuse is obtained without permitting solid refuse to slide down said conveyor toward said pit.

8. A system for receiving and processing municipal refuse as claimed in claim 6 wherein:
the bottom of said pit is inclined toward said sump to allow drainage of liquid in said pit into said sump; and
wherein said washing means comprises baffle plate means under said conveyor between said pit and said receiving means, said baffle plate means being inclined toward said pit to permit liquid drainage into said pit; and
a plurality of perforated water supply pipes extending between said conveyor and said baffle plate means and adjacent the bottom of said pit for washing drippings, dust, spores, waste material and the like into said sump.

9. A system for receiving and processing municipal refuse as claimed in claim 8 wherein some of the perforations in said water supply pipes are oriented in said pipes to direct water upwardly onto the lower side of said conveyor and through the slats of said conveyor; and the remainder of said perforations are oriented in said pipes to direct water down said baffle plate means toward said pit.

10. A system for receiving and processing municipal refuse as claimed in claim 6 and characterized further to include:
means connected to said sump for directing the washings accumulated in said sump to a storage tank for subsequent usage as inoculation material in a composting process and, alternately, to a sewer system.

11. A system for receiving and processing municipal refuse as claimed in claim 6 wherein said pit is comprised of a plurality of side walls sloping inwardly from the top toward the bottom of said pit at an angle of about sixty degrees to the vertical, whereby said pit has a large opening at its top and said refuse is directed downwardly onto said conveyor by said sloping side walls.

12. A system for receiving and processing municipal refuse as claimed in claim 11 wherein:
said pit has a substantially vertical side wall spaced horizontally from the lower, feed end of said conveyor, and
said sump is located adjacent said vertical side wall, and
wherein one of said sloping side walls comprises a flat plate hingedly connected at one of its sides to the top of said vertical side wall and extending downwardly and inwardly from said hinged connection over said conveyor, whereby access to said sump may be had by pivoting said plate to a substantially vertical position.

13. A system for receiving and processing municipal refuse as claimed in claim 8 and characterized further to include:
means for collecting waste materials containing beneficial bacteria and spores accumulating in the area beneath said receiving means and under said baffle plate means, said collecting means comprising a plurality of drain pipes communicating with said pit and extending through the ground below said baffle plate means and said receiving means; and
funnel-shaped collecting drains at the surface of the grounds below said baffle plate means and said receiving means connected to and communicating with said drain pipes.

14. In a plant for composting refuse of the type having means for preliminarily pulverizing and grinding the refuse, and cell means downstream from said pulverizing and grinding means for containing the refuse during the bacterial decomposition thereof, the improvement which comprises:
a source of aqueous fluid;
means for receiving raw refuse delivered to the plant;
means associated with said refuse receiving means for separating liquids from the refuse as delivered to said plant, said liquid separating means being disposed upstream from said pulverizing means;
first conduit means for conveying said separated liquids to said source of aqueous fluid for addition to said aqueous fluid;
second conduit means connected to said source of aqueous fluid for delivering fluid to said refuse;
valve means in said second conduit means for controlling the flow of fluid through said second conduit means; and
electrical control means responsive to the moisture content of said refuse for automatically controlling the degree of closure of said valve whereby the moisture content of refuse entering said cell means may be maintained in a predetermined range.

15. The improvement claimed in claim 14 wherein said second conduit means extends over said refuse at a point upstream from the discharge end of said pulverizing and grinding means whereby aqueous fluid introduced to said refuse from said conduit means may be thoroughly mixed with said refuse in said pulverizing and grinding means.

16. The improvement claimed in claim 14 wherein said electrical control means includes electrode means for sensing the moisture content of refuse entering said cell means.

17. The improvement claimed in claim 14 wherein said source of aqueous fluid comprises a tank containing an aqueous inoculum enriched in bacteria operative in said bacterial decomposition.

18. The improvement claimed in claim 14 wherein said electrical control means comprises:
a pair of electrodes positioned at the entrance to said cell means in spaced-apart relation and in contact with said refuse for sensing the moisture content of said refuse; and means connected between said electrodes and said valve means for opening said valve when the moisture content of said refuse reaches a preselected minimum value, and for closing said valve when the moisture content of said refuse reaches a preselected maximum value.

19. In a system for composting refuse, the improvement which comprises:
a pit for receiving the raw refuse dumped from trucks carrying said refuse, said pit having side walls and a bottom with one of said side walls extending vertically from the bottom;
truck apron means adjacent the upper edge of said vertically extending side wall;
a slatted conveyor extending across and substantially covering the bottom of the pit the slats of said conveyor being disposed closely enough to each other to prevent substantially all of said refuse from falling through said slats while the liquid in said refuse is permitted to drain through the openings between said slats to the bottom of said pit, said conveyor being positioned at a depth below the top of the pit sufficient to allow the dumped refuse to turn in falling from a truck to said conveyor and to cause the dumped refuse to strike said conveyor with an impact of sufficient magnitude to break open liquid-containing portions of the refuse whereby the free liquid in the refuse will drain through said conveyor to the bottom of the pit; and
a sump in the bottom of the pit positioned to receive the liquid drained through said conveyor.

20. The system defined in claim 19 wherein said conveyor extends upwardly from one end of the pit to remove the dumped refuse from the pit, and characterized further to include a baffle positioned under the upwardly extending portion of said conveyor, said baffle being inclined downwardly into the pit for draining wash water and liquid dripping from the upwardly extending portion of the conveyor into the pit and sump.

21. The system defined in claim 19 wherein said conveyor extends upwardly from the pit at an angle to the horizontal of about twenty-three degrees, whereby maximum liquid drainage from the refuse is obtained without permitting solid refuse to slide down said conveyor toward the pit.

References Cited by the Examiner

UNITED STATES PATENTS

| 1,535,039 | 4/1925 | Rettler | 198—58 X |
| 2,285,834 | 6/1942 | Proctor | 71—9 |
| 2,852,740 | 9/1958 | Posey et al. | 324—65 |
| 2,929,688 | 3/1960 | Riker et al. | 23—259.1 |

MORRIS O. WOLK, *Primary Examiner.*

DELBERT E. GANTZ, *Examiner.*